US011614457B2

(12) United States Patent
Sommerer et al.

(10) Patent No.: US 11,614,457 B2
(45) Date of Patent: Mar. 28, 2023

(54) METHOD AND SYSTEM FOR DETERMINING ROTATIONAL SPEED BY MEANS OF VIDEO CAMERA

(71) Applicant: Prüftechnik Dieter Busch GmbH, Ismaning (DE)

(72) Inventors: Cornelius Sommerer, Munich (DE); Bhamy Narasimha Shenoy, Hallbergmoos (DE); Frank Votteler, Munich (DE)

(73) Assignee: PRÜFTECHNIK DIETER BUSCH GMBH, Ismaning (DE)

( * ) Notice: Subject to any disclaimer, the term of this patent is extended or adjusted under 35 U.S.C. 154(b) by 252 days.

(21) Appl. No.: 16/988,309

(22) Filed: Aug. 7, 2020

(65) Prior Publication Data
US 2021/0041474 A1 Feb. 11, 2021

(30) Foreign Application Priority Data

Aug. 8, 2019 (DE) .................. 10 2019 211929.8

(51) Int. Cl.
*G01P 3/38* (2006.01)
*G01P 3/40* (2006.01)
(52) U.S. Cl.
CPC . *G01P 3/38* (2013.01); *G01P 3/40* (2013.01)
(58) Field of Classification Search
CPC ..... G01P 3/38; G01P 3/40; G01P 3/44; G06T 7/246; G06T 1/00; G06T 3/00;
(Continued)

(56) References Cited

U.S. PATENT DOCUMENTS

2003/0021493 A1* 1/2003 Nakaya .............. G06K 15/1238
369/102
2004/0197075 A1* 10/2004 Aiso ........................ G06T 3/40
386/264
(Continued)

FOREIGN PATENT DOCUMENTS

CN          201247072 Y       5/2009
CN          104535787 A       4/2015
(Continued)

OTHER PUBLICATIONS

Zhong, Jianfeng et al., "Vision-based system for simultaneous monitoring of shaft rotational speed and axial vibration using non-projection composite fringe pattern," Mechanical Systems and Signal Processing, Bd. 120, Nov. 15, 2018, pp. 765-776.
(Continued)

*Primary Examiner* — Peter D Le
(74) *Attorney, Agent, or Firm* — Aird & McBurney LP

(57) ABSTRACT

A method for determining a rotational speed of a rotatably mounted component of a machine is disclosed, wherein image data of a marked region of the machine component are obtained in the form of a plurality of frames via a video camera, and the image data are evaluated, in order to determine the periodicity of the rotation of the machine component from the change over time of the image data in the frames of the machine component. The video camera is configured by selecting an active region for obtaining the image data from the total number of pixels of the video camera, in which an observation area is imaged, which is passed through by the marked region during the rotation of the machine component, wherein the active region comprises only a portion of the total number of pixels of the video camera, to increase the frame rate correspondingly.

19 Claims, 2 Drawing Sheets

Figure 1:
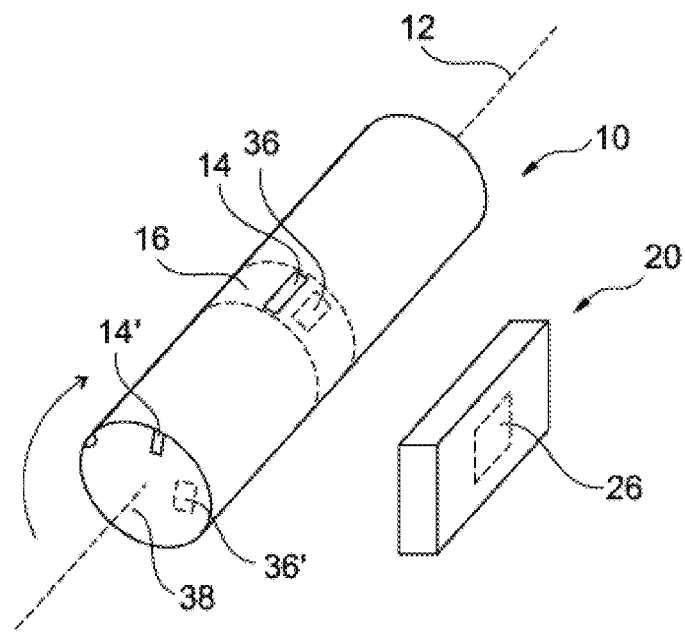

(58) Field of Classification Search
CPC .... G06T 5/00; G06T 7/00; G06T 9/00; G06T 11/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00; G06T 2219/00
See application file for complete search history.

(56) References Cited

U.S. PATENT DOCUMENTS

| | | | |
|---|---|---|---|
| 2004/0227751 A1* | 11/2004 | Anders | G06T 7/80 345/419 |
| 2007/0146692 A1* | 6/2007 | Zaman | G01N 21/55 356/237.2 |
| 2008/0089588 A1* | 4/2008 | Nagahashi | G06K 9/6256 382/296 |
| 2008/0192243 A1* | 8/2008 | Zaman | G01N 21/952 356/237.1 |
| 2009/0009837 A1* | 1/2009 | Grasser | G02B 26/123 359/204.1 |
| 2010/0114375 A1* | 5/2010 | Krieter | G02B 30/54 700/275 |
| 2010/0290695 A1* | 11/2010 | Kwirandt | G01N 21/9045 348/92 |
| 2011/0128370 A1* | 6/2011 | Booth | G01N 21/952 348/125 |
| 2013/0088610 A1* | 4/2013 | Lee | H04N 5/2329 348/208.99 |
| 2016/0161387 A1* | 6/2016 | Yasuda | G01P 3/80 356/28 |
| 2019/0041420 A1 | 2/2019 | Zhong et al. | |
| 2020/0180095 A1* | 6/2020 | Egglestone | B23Q 17/10 |

FOREIGN PATENT DOCUMENTS

| | | |
|---|---|---|
| CN | 206832833 U | 1/2018 |
| DE | 10 2010 055 533 A1 | 6/2012 |
| EP | 2950057 A1 | 12/2015 |
| EP | 3026438 A1 | 6/2016 |
| JP | 1078311 A | 3/1998 |
| JP | 2012-247209 A | 12/2012 |

OTHER PUBLICATIONS

Extended European Search Report for Application No. 20186248.9-1210 dated Dec. 11, 2020.

* cited by examiner

METHOD AND SYSTEM FOR DETERMINING ROTATIONAL SPEED BY MEANS OF VIDEO CAMERA

The invention relates to a method and a system for determining the rotational speed of a rotatably mounted component of a machine, such as, for example, a shaft.

Determining rotational speeds of machine components on the basis of video recordings is basically known. For example, a method using a CCD camera, e.g., a mobile telephone, is described in DE 10 2010 055 533 A1, in which a region of a shaft, which is provided with a marking, is illuminated with flashes of light, the frequency of which is matched to the estimated rotational speed. A method is described in CN 206832833 U, in which video images of a stroboscopically illuminated shaft are recorded, and in each case the current angle of rotation of the shaft is determined from these images, in order to derive the rotational speed therefrom. In this case, images of the front side of the shaft are recorded, from which a region is extracted for the evaluation. Similar methods are described in JP 10078311 A, JP 2012-247209 A, CN 201247072 Y, as well as CN 104535787 A.

Methods that require the use of images of a relatively high resolution in order to permit an accurate determination of the particular angular position of the machine component are suitable only for relatively low rotational speeds based on the low frame rates associated therewith.

It is an object of the present invention to create a method for determining the rotational speed of a rotatably mounted machine component, a method that can be applied to a relatively broad range of rotational speeds. Another object of the invention is to create a corresponding system.

This object is achieved according to the invention by a method according to claim 1 or a system according to claim 15. Here, the video camera is configured so that an active region of the camera detector that covers a marked region of the machine component is selected for obtaining the video data, but this region only comprises a relatively small portion of the total pixels of the detector of the video camera, in order to correspondingly increase the frame rate, so that the determination of higher rotational speeds is also possible. This solution is also particularly suitable for integration into systems in which a high-resolution camera, without anything further, has already been provided for other purposes, e.g. for aligning the shaft.

Preferred embodiments of the invention are indicated in the dependent claims.

Figure 2:
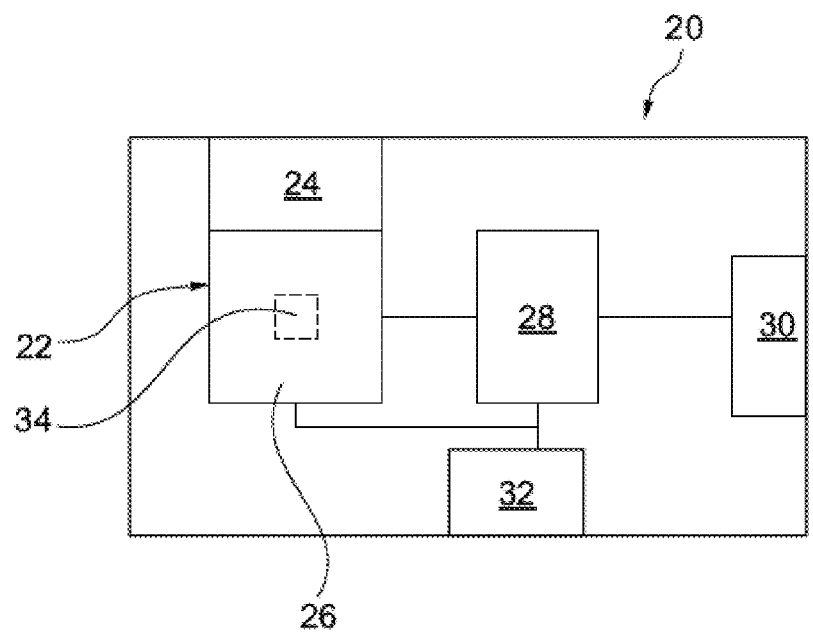
Figure 3:
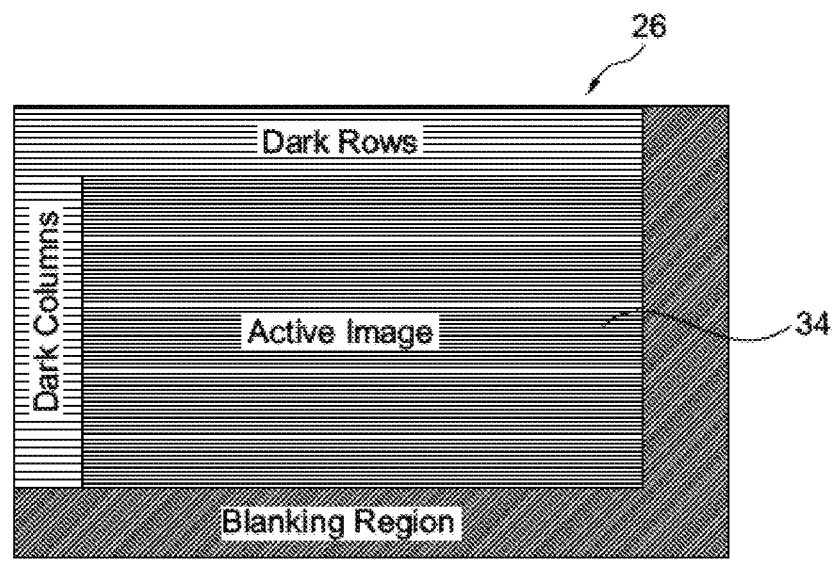
Figure 4:
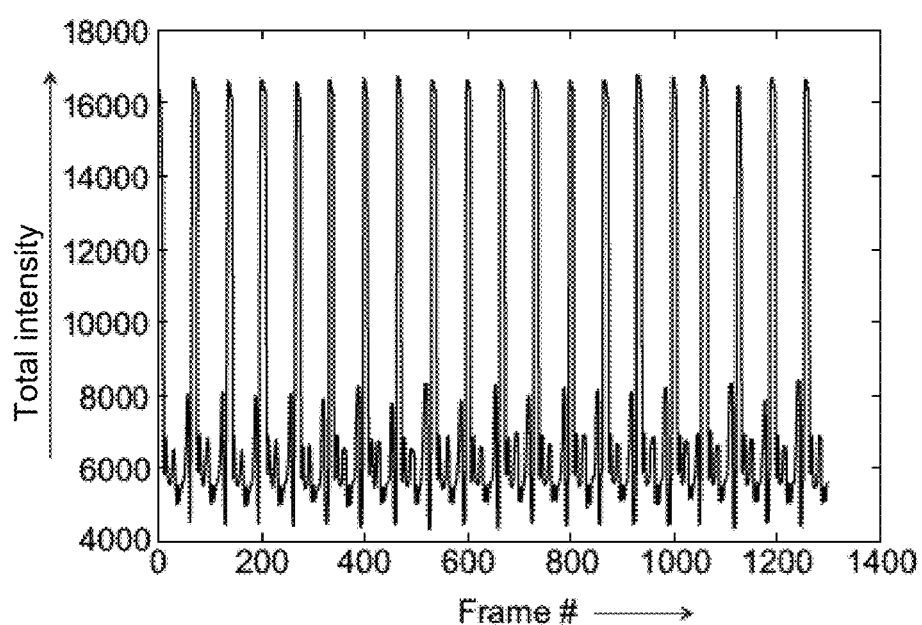

The invention is explained in detail in the following on the basis of the appended drawings, by way of example. Shown herein:

FIG. 1 a schematic representation of an example of the use of a system for determining the rotational speed of a machine component;

FIG. 2 a schematic representation of components of the system of FIG. 1;

FIG. 3 an example of the selection of an active region of the video camera of the system of FIGS. 1 and 2; and FIG. 4 an example of the course of total intensity of the pixels of the active region as a function of time.

FIGS. 1 and 2 show a schematic representation of an example of a system 20 for determining the rotational speed of a rotatably mounted machine component, such as, for example, a shaft 10 that is rotatable around its longitudinal axis 12. The shaft 10 is provided on its outer surface with a marking or reflectance marks 14 that rotate in a strip-shaped region 16 during the rotation of the shaft 10. The system 20 is preferably implemented in a portable device, which can be designed, for example, in a kind of tablet computer. The system 20 comprises a video camera 22 having an optics 24 and a detector 26, which preferably involves a CMOS chip or a CCD chip, a data processing unit 28 for evaluating the image data supplied by the detector 26, an output unit 30, as well as an input unit 32 serving as user interface. The output unit 30 and the input unit 32 are preferably designed in the form of a touch screen.

The system 20 determines the rotational speed of the shaft 10 by tracking, by means of the video camera 22, the movement of a marked region of the shaft 10 that is formed by the marking 14 in the example shown, in order to ascertain the periodicity of the movement of the marked region, so as to determine therefrom the rotational speed of the shaft 10. In the example shown, the strip 16 or an area 36 thereof is monitored by the camera 22 for this purpose. Here, the video camera records a sequence of individual images ("frames"), wherein a determined time difference, which results from the time necessary for the readout of the relevant pixels of the detector 26, lies between every two individual images. The readout time necessary for an individual image depends here on the readout speed per pixel (this can amount to 10 MHz, for example) and the total number of pixels read out. The reciprocal of the readout time or of the time interval between two individual images is also called the frame rate. The frame rate in turn establishes an upper limit for the determinable rotational speed, since the recording of a specific number of individual images per revolution of the shaft is necessary for determining the rotational speed. The more individual images there are recorded per revolution, the greater is the accuracy of the rotational speed determination.

A typical size of the camera chip is 5 megapixels, for example, in a resolution of 2592×1944 pixels. The readout of such a large number of pixels would limit the range of rotational speeds to be determined with the camera to relatively small values, which would not be practicable in many cases of application. However, the use of a detector 26 having a large number of pixels for applications other than the determination of rotational speed can be important, for example, for applications of shaft alignments.

The present invention proposes to increase the frame rate to values that are practicable for determining rotational speed by selecting from the total number of pixels of the detector 26 a relatively small, active region 34 (see FIG. 3), which comprises only a relatively small portion of the total number of pixels of the detector 26, but nevertheless sufficiently comprises the marked region of the shaft 10. Thus, only a small portion of the pixels of the detector 26 is actually read out, so that the time necessary for the readout of an individual image is shortened correspondingly and the frame rate is correspondingly increased. We do not read out the region shown as the "blanking region" in FIG. 3, while the regions shown as "dark rows" or "dark columns" are in front of the actual image and basically can be part of the active image. The electronics could use these regions, for example, when several clock cycles are required for synchronization.

For example, the active region 34 of the detector 26 can be selected so that an area 36 of the strip 16 that has a smaller dimension than the marking 14 is imaged on it.

Preferably, the active region 34 comprises between 1 and 65,536 pixels, for example, 256 pixels. In this case, the active region preferably comprises between 1 and 256 rows, for example 16 rows, and between 1 and 256 columns, for example 16 columns. Preferably, the number of pixels of the active region 34 amounts to between 0.000004% and 18% of the total number of pixels of the detector 26, for example, 0.005%. The total number of pixels of the detector 26 typically amounts to between 1 M pixels and 20 M pixels. Preferably, the frame rate amounts to at least two times, typically at least four times the rotational speed that is to be detected. Thus, by way of example, for detecting a rotational speed of 50 Hz, the frame rate should preferably amount to at least 200 Hz. This requirement then correspondingly establishes a maximum number of pixels for the active region, which is based on the readout speed of the individual pixel.

In the simplest case, for the evaluation of the image data for each individual image, a total intensity of the pixels of the active region 34 is determined, i.e., the individual values of the pixels are summed up. The thus-determined total intensity of the pixels of the active region 34 can then be compared with a threshold value for each image, wherein values above the threshold value correspond to the case when the marking 14 is found at least in part in the observation area. In this way, the time point when the marking 14 enters into the observation area 36 can be established: This is then the case when the total intensity of the pixels of the active region 34 exceeds the threshold value. In this way, an optical trigger sensor can be implemented, wherein the marking 14 serves as trigger mark. Here, the time points of the passage of the marking 14 through the observed area 36 can be established, since each individual image corresponds to a specific (recording) time point. The sequence number of the particular individual image thus corresponds to a time scale that is to be calibrated correspondingly.

In this way, in a somewhat more complex evaluation, the total intensity of the pixels of the active region 34 can be evaluated as a function of time, wherein for each individual image, not only the binary information, "total intensity above threshold value" or "total intensity below threshold value" is then used, but rather the actual total intensity value. An example of such a determination of the total intensity of the pixels of the active region 34 of each individual image as a function of time is shown in FIG. 4, from which the periodicity of the circulation of the marking 14 is apparent. In this case, the data obtained with the application of statistical methods can be evaluated, for example, by fitting a target function. In particular, the total intensity of the pixels of the active region 34 can be evaluated here in a phase-accurate manner as a function of time, in order to track order.

In the evaluation, an autocorrelation of the pixels of the active region 34 also can be employed, which is then particularly advantageous when a special marking 14 is not used. In this case, the position of a characteristic structure or the presence of a characteristic structure in the respective individual image can be identified in the evaluation (which corresponds to recognition of a "mark" in the individual image).

In the simplest case, the illumination of the marked region of the shaft 10, i.e., the illumination in the observation area 36, is kept constant during the measurement of rotational speed.

According to a preferred variant, during the measurement the observation area 36 is illuminated with light flashes similar to a kind of stroboscope, flashes that are synchronized with the frame rate of the camera 22 or with the time points of image recording.

In the simplest case, the active region of n rows and m columns is formed, wherein all pixels found in this region are read out. In one variant, a portion of the pixels found in such a region can be skipped, in order to obtain a greater covering of the image with a predefined number of pixels.

Preferably, the camera 22 can also be configured by way of the input unit 32 during an ongoing rotational speed determination with respect to the size of the active region 34 and/or of the position of the active region 34 on the surface of the detector 26.

In the example shown in FIG. 1, the camera 22 records the shaft 10 laterally, i.e., from a direction that is essentially perpendicular to the axis of rotation 12. Applications are also possible, however, in which the camera 22 records the shaft 10 from a direction that is essentially parallel to the axis of rotation 12. For example, the camera 22 can image an area 36' on a front side 38 of the shaft 10 in the active region 34, wherein a marking 14', which passes through the area 36' during the rotation of the shaft 10, can be provided on the front face 38.

It is understood that the invention can be applied not only to shafts, but also to other machine components mounted in a rotatable manner.

The video camera 22 can also be used in order to visualize the shaft 10, for example in a representation as a three-dimensional image, wherein, however, not only the pixels of the relatively small active region 34 selected for the rotational speed determination will then be read out, but also a larger region.

The invention is particularly suitable for integrating the possibility of a rotational speed determination in a measurement system that also takes care of other measurement tasks, wherein a higher resolution of the camera is then used; for example, the present invention can be used in a manual device for shaft alignment; such devices are marketed, for example, by the Prüftechnik company under the name "Rotalign Touch". The camera provided in such a device can typically record approximately 900 images per minute with full resolution, which is too slow, however, for a rotational speed determination; for example, approximately 1200 images per minute (corresponding to a frame rate of 200 Hz) are required for determining a rotational speed of 3000 rpm (50 Hz). With the present invention, the active region can be reduced to 16×16 pixels, for example, which then makes possible a frame rate of 2.2 kHz, whereby rotational speeds of 50 Hz and above can be determined therefrom. Basically, however, in practice, frame rates of more than 10 Hz can be obtained, which then permits the determination of rotational speeds of more than 100 Hz.

The invention claimed is:

1. A method for determining a rotational speed of a rotatably mounted component of a machine, wherein
    image data of a marked region of the machine component are obtained in the form of a plurality of frames by means of a video camera;
    the image data are evaluated in order to determine the periodicity of the rotation of the machine component from the change over time of the image data of the marked region in the frames of the machine component, so as to determine the rotational speed of the machine component,
    wherein the video camera is configured by selecting from the total number of pixels of the video camera an active region for obtaining the image data, in which an observation area is imaged, which is passed through by the marked region during the rotation of the machine component, wherein the active region comprises only a portion of the total number of pixels of the video camera, in order to increase the frame rate correspondingly, and wherein the observation area that is imaged by the video camera is shorter than the marked region along the axis of rotation of the machine component.

2. The method according to claim 1, further characterized in that the active region comprises between 0.000004% and 18% of the total number of pixels of the camera.

3. The method according to claim 1, further characterized in that the active region comprises between 1 and 65,536 pixels, wherein the active region preferably comprises between 1 and 256 rows and between 1 and 256 columns.

4. The method according to claim 1, further characterized in that, in the evaluation, a total intensity of the pixels of the active region is determined.

5. The method according to claim 4, further characterized in that, in the evaluation, the total intensity of the pixels of the active region is compared with a threshold value, in order to detect the entry of the marked region into the observation area.

6. The method according to claim 4, further characterized in that, in the determination of the rotational speed, the total intensity of the pixels of the active region is evaluated as a function of time.

7. The method according to claim 6, further characterized in that the total intensity of the pixels of the active region is evaluated in a phase-accurate manner as a function of time, for the purpose of "tracking order".

8. The method according to claim 1, further characterized in that in the evaluation, an autocorrelation of the pixels of the active region is determined.

9. The method according to claim 1, further characterized in that, in the evaluation, the position of the same characteristic structure is identified in each frame.

10. The method according to claim 1, further characterized in that a portion of the pixels found in the active region is skipped over, in order to increase the covering of the image with the given number of pixels.

11. The method according to claim 1, further characterized in that the camera can be configured with respect to the size and/or the position of the active region on the detector surface of the camera during an ongoing rotational speed determination.

12. The method according to claim 1, further characterized in that the camera records the machine component from a direction that is essentially perpendicular to the axis of rotation of the machine component, or that is essentially parallel to the axis of rotation of the machine component.

13. The method according to claim 1, further characterized in that the camera is used in order to also show regions of the machine component outside the marked region, wherein pixels are also read out outside the active region selected for the rotational speed determination.

14. The method according to claim 1, wherein an observed area of the machine component that is imaged by the active region is smaller than an area of the marked region of the machine component.

15. The method according to claim 1, wherein the marked region comprises a reflectance mark.

16. A system for determining a rotational speed of a rotatably mounted component of a machine, comprising
a video camera for obtaining image data of a marked region of the machine component in the form of a plurality of frames,
a data processing unit for evaluating the image data in order to determine the periodicity of the rotation of the machine component from the change over time of the image data of the marked region in the frames of the machine component, so as to determine the rotational speed of the machine component, as well as an output unit for output of the rotational speed of the machine component,
wherein the video camera is configured by selecting an active region for obtaining the image data from the total number of pixels of the video camera, in which an observation area is imaged, which is then passed through by the marked region during the rotation of the machine component, wherein the active region comprises only a portion of the total number of pixels of the video camera, in order to increase the frame rate correspondingly, and
wherein the observation area that is imaged by the video camera is shorter than the marked region in at least one dimension.

17. The system according to claim 16, further characterized in that, in the evaluation, the position of the same characteristic structure is identified in each frame.

18. The system according to claim 16, wherein an observed area of the machine component that is imaged by the active region is smaller than an area of the marked region of the machine component.

19. The system according to claim 16, wherein the marked region comprises a reflectance mark.

* * * * *